Aug. 31, 1965    H. H. P. LEMMERMAN    3,203,259
VISCOUS DAMPED SENSING DEVICE
Filed Dec. 31, 1956
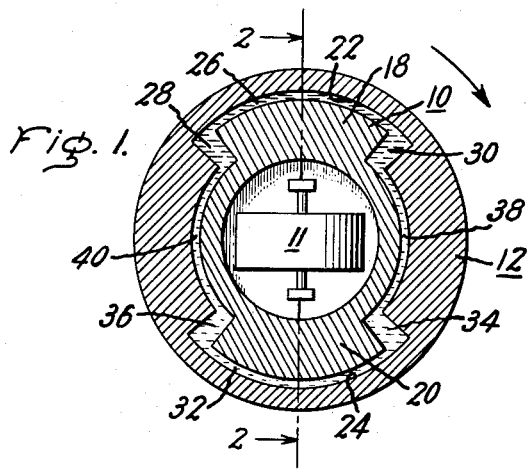
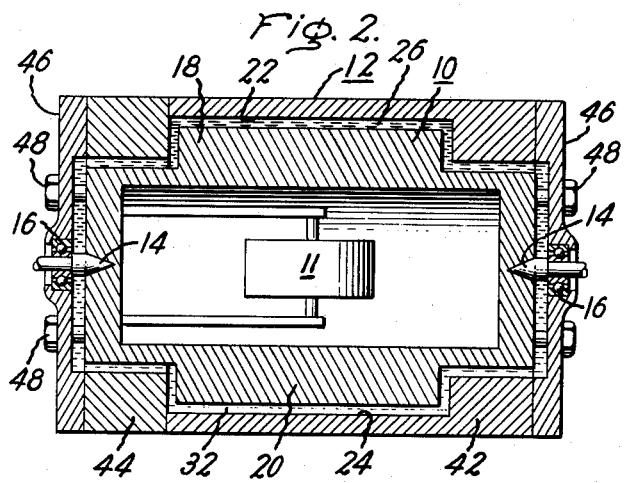
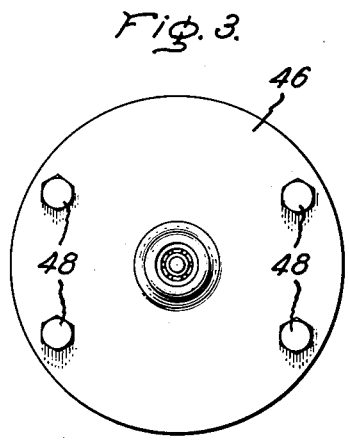
Inventor:
Harold H. P. Lemmerman,
by Roe D. McBurnett
His Attorney.

United States Patent Office 3,203,259
Patented Aug. 31, 1965

1

3,203,259
VISCOUS DAMPED SENSING DEVICE
Harold H. P. Lemmerman, Schenectady, N.Y., assignor to General Electric Company, a corporation of New York
Filed Dec. 31, 1956, Ser. No. 631,903
15 Claims. (Cl. 74—5.5)

This invention relates to a viscous damped sensing device and more particularly to a viscous damped sensing device in which the viscous damping is applied about a single axis of the sensing device.

In the flight control field and related vehicle control arts, such as ship control or radar control, a number of sensing devices are utilized to sense various movements of the controlled vehicle and to provide a signal proportional to the sensed movement to automatically control the vehicle. Examples of these sensing devices are gyroscopes and accelerometers. As is well known to those skilled in these related arts, these sensing devices must be damped; that is, their motion in response to vehicle movement must be restrained, especially in closed loop operation of the device, to provide the desired characteristics to the device. One desired characteristic is to prevent excessive oscillation of the device and provide an averaging signal of the position of the sensing element. The damping for such devices is generally applied to the sensing element of the sensing device.

There are many known means for supplying this damping to sensing devices. Examples of these known damping means would include magnetic damping means and electrical damping means. Magnetic damping means require the use of large permanent magnets to provide the necessary damping to the sensing element. These magnets add extra weight to the system and set up stray magnetic fields which may affect other components of the control system or attract iron particles to the sensing element, unless these magnets are properly shielded. Electrical damping means usually contained in the feed-back loop to the sensing device require much electronic equipment of considerable weight and expense, which is easily damaged by vibration and mechanical shock. Thus, electrical damping means have a short, useful life as well as being excessive in weight and very costly.

To obviate the above-mentioned problems, the sensing devices used in the related control arts have utilized viscous damping means. In this type of damping, the sensing element or a sealed case containing the sensing element is enclosed in an outer sealed housing. The space between the element or its sealed case and the outer housing is filled with a viscous fluid. As the sensing element or its sealed case, as the case may be, moves relative to the outer housing, a friction force or a shearing force between the element or its case and the fluid produces a viscous damping of such element. This type of damping requires sufficiently viscous fluid which is a liquid at the operating temperatures of the sensing device but which in general becomes a solid that shrinks when the device is cooled. This induces strains in the flexible leads of the sensing device which may cause them to break. It also produces problems in filling the space between the sensing element and the outer housing, such as requiring that the damping fluid be heated. These problems would be dispensed with by using a fluid that would not solidify at any of the ambient temperatures to which the sensing device may be subjected. However, such a fluid would not produce the necessary viscous damping desired in present sensing devices due to its necessarily low viscosity.

Therefore, it is one object of this invention to provide a sensing device having the necessary viscous damping while using a low viscosity fluid.

It is a further object of this invention to produce a new

2 and improved viscous damped sensing device using a fluid which will not solidify at any of the ambient temperatures to which the sensing device may be subjected.

In carrying out this invention in one form, a sensing element is provided pivotally mounted for rotation within an outer housing. The area between the sensing element and the outer housing is filled with a low viscosity fluid. Means are provided on the sensing element complementary with means formed in the outer housing whereby movement of the sensing element relative to the outer housing causes the fluid to flow in a laminar manner between the means on the sensing element and the cooperative means in the outer housing to produce damping, which is referred to as Newtonian damping.

This invention will be better understood in the light of the following description taken in connection with the accompanying drawings wherein:

FIGURE 1 is a sectional view of one form of a viscous damped sensing device made according to the present invention;

FIGURE 2 is a sectional view of one form of the invention taken on the lines 2—2 of FIGURE 1; and FIGURE 3 is an end view of the device of FIG. 2.

Referring to the drawing wherein like numerals are used to indicate like parts throughout and especially with reference to FIGURES 1 and 2, this invention in one form is shown as a sensing device comprising a sensing element or case 10 pivotally mounted for rotation within an outer housing 12. The sensing element or case 10 is shown in the drawing in the form of a hollow element or case within which a gyroscopic device 11 may be mounted, if desired. However, the element 10 may also be the sensing element of other types of sensing devices, as for example an accelerometer. The element 10 is mounted concentrically within the outer housing 12 by means of pivots 14—14 which are rotatably secured in bearings 16—16 in the outer housing 12.

The element 10 and the outer housing 12 are so designed that the element 10 is in the form of a rotor mounted in a stator which is housing 12. The space between the element 10 and the housing 12 may be filled in any desired manner with a low viscosity fluid which will not freeze at the lowest temperature to be encountered by the device, for example "Heptacosa," which freezes at −32° C. In order to provide the desired damping for relative movement between the element 10 and the housing 12, using a low viscosity fluid, means are provided on the element 10 complementary with means on the housing 12 to cause the damping fluid to have a laminar flow between these means to provide Newtonian damping. It is preferred that these means be raised portions on the element 10 cooperating with recessed portions on the housing 12. As shown in FIGURE 1 of the preferred embodiment, the means on element 10 take the form of pumping vanes 18, 20 which are formed to fit within slots or grooves 22, 24 respectively, formed in housing 12. The pumping vanes 18, 20 and grooves 22, 24 are so designed that they form a channel 26 between vane 18 and the top of groove 22 which is much narrower than the areas 28, 30 formed between the sides of vane 18 and the sides of groove 22. In the same manner, the channel 32 is formed between vane 20 and the top of groove 24 and is much narrower than the areas 34, 36 formed by each side of vane 20 and the sides of groove 24. Also the rotor element 10 is formed to fit within stator element 12 so as to form channels 38, 40 between opposite sides of rotor element 10 and stator element 12, as shown in FIG. 1. The channels 38, 40 are designed so that the distance between rotor element 10 and stator element 12 is the same as in channels 26, 32. Thus, should the element 10 be caused to rotate in a clockwise fashion, as shown by the arrow in FIGURE 1, the fluid in the areas 30, 36 would be compressed, causing the fluid to flow out of areas 30, 36 through the narrow channels 26, 32 respectively and into the enlarged areas 28, 34. The fluid will also be caused to flow from areas 30, 36 through the narrow channels 38, 40 respectively, into the enlarged areas 34, 28. Thus, the design of the areas is such that the fluid flow through channels 26, 38 and 32, 40 is in a laminar manner causing Newtonian damping of the sensing element 10. This damping is a linear damping so that, should the movement of element 10 with respect to housing 12 double in velocity, the damping effect of the fluid would also double. Of course, when the rotor 10 turns at a very high velocity the flow through the channels 26 32 38 and 40 will be turbulent thus causing even greater damping.

It is to be understood that any number of vanes and grooves could be used. Obviously, one such vane would be sufficient. However, the preferred embodiment employs two vanes as shown and described.

In order to assemble the device, the housing 12 is formed in two parts 42, 44 and is provided with a cap 46 at each end. The parts 42, 44 and end caps 46 are sealed to form the housing 12 in any desired manner. As is shown in the drawing, FIGURE 2 and FIGURE 3, bolts 48 are provided which, if desired, may extend completely through the housing 12 or may merely extend sufficiently within the part 44 to properly secure and seal the entire housing.

As hereinbefore noted, the element 10 may, if desired, be a sealed case within which a gyroscopic element may be mounted. The gyro element 11 is shown mounted with its spin axis at right angles to the pivot axis of the element 10, thereby causing the gyro to precess in either a clockwise or counterclockwise manner considered from FIGURE 1, so as to obtain the proper damping by means of the pumping vanes 18, 20 and grooves 22, 24 respectively. Such use of the invention hereinbefore set forth will appear obvious to those skilled in the art.

It is obvious to those skilled in the art that various modifications may be made in the above-described invention. The embodiments shown are by way of example only, since many substitutions may be made without departing from the spirit and scope of the invention as defined in the appended claims.

I claim:

1. A viscous damped sensing device comprising a rotor element, a stator element enclosing said rotor element, a movement sensing device mounted within said rotor element, fluid damping means filling the space between said rotor element and said stator element, said fluid damping means comprising a low viscosity fluid means on said rotor element complementary with means in said stator element for producing flow of said fluid between said means during relative movement between said rotor element and said stator element, said means on the rotor element and said means on the stator element cooperating to define a plurality of narrow channels therebetween whereby said relative movement is damped.

2. In a viscous damped sensing device, a stator element, a rotor element enclosed by said stator element, a movement sensing device mounted within said rotor element, a low viscosity fluid, which will not solidify at the lowest ambient temperature to be encountered by the sensing device, entirely filling the space between said stator element and said rotor element, pumping means on said rotor element cooperating with groove means in said stator element to define a plurality of narrow channels for producing flow of said low viscosity fluid between said cooperating means during relative movement between said rotor element and said stator element, thereby providing Newtonian damping for said rotor element.

3. A viscous damped sensing device comprising a housing formed to include at least one recessed portion, a rotating element mounted for limited rotation within said housing, a movement sensing device mounted within said rotating element, said element being formed to include a raised portion complementary to said recessed portion and extending into said recessed portion forming a restricted space between said recessed portion and said raised portion, a low viscosity fluid filling the space between said housing and said element, said raised portion and said recessed portion being so constructed and arranged that during relative movement between said housing and said element, said fluid is caused to flow between said portions, thereby damping said relative movement.

4. A viscous damped sensing device comprising a housing, a hollow element enclosed within said housing, a movement sensing device mounted within said hollow element, a low viscosity fluid entirely filling the space between said housing and said element, and raised means on said element cooperating with recessed means in said housing to form a channel therebetween, whereby relative movement between said housing and said element causes flow of said fluid through said channel to damp said relative movement.

5. In a viscous damped sensing device, a sealed housing, a hollow element mounted for limited rotation within said housing, a movement sensing device mounted within said hollow element, recessed portions formed in said housing, raised portions formed on said element, said raised portions extending into said recessed portions, said portions being so designed to form open areas between their sides and a narrow channel between their tops communicating with said open areas, a low viscosity fluid filling the space between said element and said housing, whereby limited movement of said element relative to said housing causes flow of said fluid through said channel between said open areas to damp said relative movement.

6. A viscous damped sensing device as claimed in claim 5 in which said housing and said element are designed so as to form other channels between said housing and said element as narrow as said channels between said recessed and said raised portions, said other channels also communicating with said open areas.

7. In a viscous damped sensing device adapted to sense movement to which the device is subjected; a stator element, a rotor element enclosed by said stator element, a movement sensing device mounted within said rotor element, a recessed portion formed in said stator element, a raised portion formed on said rotor element, said raised portion extending into said recessed portion, said portions being designed to form a narrow channel between the top of said raised portion and the bottom of said recessed portion and open areas between the sides, said channel communicating with said open areas, a low viscosity fluid filling the space between said elements, whereby limited movement of said rotor element compresses said fluid in one open area and forces it to flow through said channel to another open area to thereby provide Newtonian damping of said movement.

8. In a floated gyroscope: a generally hollow cylindrical housing; a generally hollow cylindrical chamber in said housing; a gyroscope in said chamber; support means for rotatably supporting said chamber in said housing for rotation about an axis, said chamber having a normal position relative to said housing; a fluid in said housing and surrounding said chamber; and means for resisting relative rotation of said chamber and said housing about said axis comprising a plurality of vanes on said chamber extending generally parallel to said axis and outwardly from said chamber, toward said housing defining a plurality of restrictive gaps between said vanes on said chamber and said housing, and a plurality of vanes on said housing extending generally parallel to said axis and inwardly from said housing toward said chamber defining a plurality of restrictive gaps between said vanes on said housing and said generally cylindrical chamber, said vanes on said housing and said chamber terminating with arcuate faces of substantial width.

9. In a floated inertial instrument: a generally hollow cylindrical chamber in said housing; an inertial element in said chamber; support means for rotatably supporting said chamber in said housing for rotation about an axis, said chamber having a normal position relative to said housing; a fluid in said housing and surrounding said chamber; and means for resisting relative rotation of said chamber and said housing about said axis comprising a plurality of vanes on said chamber extending generally parallel to said axis and outwardly from said chamber toward said housing defining a plurality of restrictive gaps between said vanes on said chamber and said generally hollow cylindrical housing, and a plurality of vanes on said housing extending generally parallel to said axis and inwardly from said housing toward said chamber defining a plurality of restrictive gaps between said vanes on said housing and said generally cylindrical chamber.

10. In a floated gyroscope: a housing; a chamber; a gyroscope mounted in said chamber; support means for rotatably supporting said chamber in said housing for rotation relative to said housing about an axis, said chamber having a normal position relative to said housing; a fluid in said housing and surrounding said chamber; and means for resisting relative rotation of said chamber and said housing about said axis comprising a plurality of vanes on said chamber extending generally parallel to said axis and outwardly from said chamber and a plurality of vanes on said housing extending generally parallel to said axis and inwardly from said housing, as to define a plurality of restrictive gaps.

11. In a floated gyroscope: a housing; a chamber; a gyroscope mounted in said chamber; support means for rotatably supporting said chamber in said housing for rotation relative to said housing about an axis, said chamber having a normal position relative to said housing; a fluid in said housing and surrounding said chamber; and means for resisting relative rotation of said chamber and said housing about said axis compirsing a plurality of vanes on said chamber extending generally parallel to said axis and outwardly from said chamber toward said housing defining a plurality of restrictive gaps between said vanes on said chamber and said housing, and a plurality of vanes on said housing extending generally parallel to said axis and inwardly from said housing toward said chamber defining a plurality of restrictive gaps between said vanes on said housing and said chamber.

12. In a floated gycroscope: a housing; a chamber; a gyroscope mounted in said chamber; support means for rotatably supporting said chamber in said housing for rotation relative to said housing about an axis, said chamber having a normal position relative to said housing; a fluid in said housing and surrounding said chamber; and means for resisting relative rotation of said chamber and said housing about said axis comprising a vane on said chamber extending outwardly from said chamber toward said housing and a vane on said housing extending inwardly from said housing toward said chamber, said vanes, chamber and housing being proportioned so as to define restrictive gaps, and said vanes having a substantial width.

13. A floated inertial instrument comprising a housing; a chamber; support means for rotatably supporting said chamber in said housing for rotation about an axis; an inertial element mounted in said chamber; a fluid filling said housing and surrounding said chamber; and means for resisting rotation of said chamber about said axis comprising a projection on said chamber extending outwardly toward said housing, defining a restrictive gap between said projection on said chamber and said housing, and a projection on said housing extending inwardly toward said chamber, defining a restrictive gap between said projection on said housing and said chamber, said projections being positioned relative to one another so as to cause movement of said fluid upon relative rotation between said housing and said chamber.

14. In an inertial instrument: a housing, a gimbal; means for rotatably supporting said gimbal on said housing for relative rotation therebetween about an axis; a gyroscope mounted on said gimbal; and means for resisting relative rotation of said gimbal and said housing about said axis comprising a plurality of vanes on said gimbal extending substantially parallel to said axis and radially from said gimbal toward said housing, a plurality of vanes on said housing extending substantially parallel to said axis and radially from said housing toward said gimbal, fluid means in contact with said vanes, and restrictive gap means, said vanes on said housing and said gimbal coacting together and with said fluid means to pump said fluid means through said restrictive gap means upon relative rotation between said housing and said gimbal about said axis.

15. In an inertial instrument: a housing; a gimbal; means for rotatably supporting said gimbal on said housing for relative rotation therebetween about an axis; inertial means mounted on said gimbal; and means for resisting relative rotation of said gimbal and said housing about said axis comprising a plurality of vanes on said gimbal extending substantially radially from said gimbal toward said housing, a plurality of vanes on said housing extending substantially radially from said housing toward said gimbal, fluid means in contact with said vanes, and restrictive gap means, said vanes on said housing and said gimbal coacting together and with said fluid means to pump said fluid means through said restrictive gap means upon a relative rotation between said housing and said gimbal about said axis.

References Cited by the Examiner

UNITED STATES PATENTS

| | | | |
|---|---|---|---|
| 1,176,014 | 3/16 | Wyeth et al. | |
| 1,908,349 | 5/33 | Heizmann | 188—101 X |
| 2,503,143 | 4/50 | Wasdell | 188—88 |
| 2,590,185 | 3/52 | Land | 188—90 X |
| 2,631,690 | 3/53 | Dunham. | |
| 2,834,213 | 5/58 | Fredericks | 74—5.5 |

FOREIGN PATENTS 1,038,985   5/53   France.

BROUGHTON G. DURHAM, *Primary Examiner.*

A. JOSEPH GOLDBERG, *Examiner.*

UNITED STATES PATENT OFFICE
CERTIFICATE OF CORRECTION

Patent No. 3,203,259                            August 31, 1965

Harold H. P. Lemmerman

It is hereby certified that error appears in the above numbered patent requiring correction and that the said Letters Patent should read as corrected below.

Column 4, line 74, after "cylindrical" insert -- housing; a generally hollow cylindrical --; column 5, line 22, for "for" read -- of --; column 6, line 28, before "relative" insert -- a --.

Signed and sealed this 12th day of April 1966.

(SEAL)
Attest:

ERNEST W. SWIDER                            EDWARD J. BRENNER
Attesting Officer                               Commissioner of Patents